(12) United States Patent
Franke et al.

(10) Patent No.: US 11,017,968 B2
(45) Date of Patent: May 25, 2021

(54) ELECTRICAL SWITCH

(71) Applicant: Siemens Aktiengesellschaft, Munich (DE)

(72) Inventors: Henry Franke, Berlin (DE); Stefan Haebel, Oberasbach (DE); Rainer Huentemeier, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 775 days.

(21) Appl. No.: 15/182,674

(22) Filed: Jun. 15, 2016

(65) Prior Publication Data

US 2016/0379786 A1 Dec. 29, 2016

(30) Foreign Application Priority Data

Jun. 24, 2015 (DE) .......................... 102015211666.2
Dec. 15, 2015 (DE) .......................... 102015225243.4

(51) Int. Cl.
| | |
|---|---|
| *H01H 3/26* | (2006.01) |
| *H01H 33/36* | (2006.01) |
| *H01H 33/38* | (2006.01) |
| *H01H 47/00* | (2006.01) |
| *H01H 61/00* | (2006.01) |
| *H01H 71/02* | (2006.01) |

(Continued)

(52) U.S. Cl.
CPC ......... *H01H 71/0228* (2013.01); *H01H 9/168* (2013.01); *H01H 71/123* (2013.01); *H01H 71/7409* (2013.01); *H01H 2071/006* (2013.01); *H01H 2300/03* (2013.01); *H04W 4/80* (2018.02); *Y02B 90/20* (2013.01); *Y04S 20/14* (2013.01)

(58) Field of Classification Search
CPC ....... H04Q 3/00; E05B 17/22; E05B 47/0012; E05B 2047/002; E05B 2047/003
USPC .......................................................... 307/143
See application file for complete search history.

(56) References Cited

U.S. PATENT DOCUMENTS

| | | | |
|---|---|---|---|
| 4,870,531 A | 9/1989 | Danek | |
| 4,958,252 A * | 9/1990 | Murphy | ................. H01H 73/14 361/93.3 |

(Continued)

FOREIGN PATENT DOCUMENTS

| | | |
|---|---|---|
| CN | 101763994 A | 6/2010 |
| CN | 102082044 A | 6/2011 |

(Continued)

OTHER PUBLICATIONS

Chinese Office Action and English translation thereof dated Nov. 16, 2017.

(Continued)

*Primary Examiner* — Quan Tra
(74) *Attorney, Agent, or Firm* — Harness, Dickey & Pierce, P.L.C.

(57) ABSTRACT

An electrical switch for switching an electric current is disclosed. The electrical switch includes an electronic trip unit, embodied in a bipartite fashion. A first part of the trip unit is fixedly connected to the electrical switch and includes protection functions of the electrical switch. A second part of the trip unit is embodied mountably and detachably on the electrical switch and defines the protection functions enabled for the customer.

27 Claims, 6 Drawing Sheets

(51) Int. Cl.
*H01H 71/00* (2006.01)
*H01H 9/16* (2006.01)
*H01H 71/74* (2006.01)
*H01H 71/12* (2006.01)
*H04W 4/80* (2018.01)

(56) References Cited

U.S. PATENT DOCUMENTS

| | | | | |
|---|---|---|---|---|
| 8,325,485 B2* | 12/2012 | Haugen | ............... | G09F 9/00 |
| | | | | 312/223.1 |
| 2003/0048589 A1* | 3/2003 | Tignor | ............... | H02H 3/006 |
| | | | | 361/93.3 |
| 2008/0158763 A1* | 7/2008 | Dougherty | ......... | H01H 71/7409 |
| | | | | 361/93.2 |
| 2009/0050455 A1 | 2/2009 | Meckler | | |
| 2009/0072022 A1 | 3/2009 | Tripathi | | |
| 2009/0140871 A1* | 6/2009 | Titus | ............ | H02H 3/04 |
| | | | | 340/638 |
| 2010/0157497 A1 | 6/2010 | Williams | | |
| 2011/0127852 A1 | 6/2011 | Papallo, Jr. | | |
| 2011/0128005 A1* | 6/2011 | Weiher | ............ | H02H 3/044 |
| | | | | 324/424 |
| 2011/0181379 A1 | 7/2011 | Sohn | | |
| 2011/0251910 A1* | 10/2011 | Dimmick | ............ | G06Q 20/12 |
| | | | | 705/17 |
| 2013/0062172 A1* | 3/2013 | Shvach | ............ | H01H 71/04 |
| | | | | 200/308 |
| 2014/0118875 A1* | 5/2014 | Carlino | ............ | H01H 71/74 |
| | | | | 361/93.2 |
| 2014/0246477 A1* | 9/2014 | Koch, Jr. | ............ | A61B 17/068 |
| | | | | 227/180.1 |
| 2015/0130567 A1* | 5/2015 | Jang | ............ | H01H 71/74 |
| | | | | 335/21 |
| 2016/0064915 A1* | 3/2016 | Schwinn | ............ | H02H 3/006 |
| | | | | 361/78 |
| 2017/0062166 A1* | 3/2017 | Lagree | ............ | H01H 71/10 |

FOREIGN PATENT DOCUMENTS

DE 3926414 B4 2/2006
EP 2013892 B1 6/2014

OTHER PUBLICATIONS

IEC 60947-2 (Deutsche Fassung EN 60 947-2 Niederspannungsschaltgeräte—Teli 2: Jan. 2014); 2014.
Office Action for Chinese Patent Application No. 201610408994.X dted Feb. 2, 2019 and English translation thereof.
Office Action for German Patent Application No. 10 2015 225 243.4 dated Jun. 29, 2020 and English translation thereof.
Office Action for German Patent Application No. 10 2015 225 243.4 dated Jun. 29, 2020.
Lai Xisong et al; "Computer Cryptography and its Application"; National Press of Defense Industry, First Edition; Jul. 31, 2001; p. 181.
Office Action for Chinese Patent Application No. 201610408994.X dated Aug. 31, 2020 and English translation thereof.
Lai Xisong et al; "Computer Cryptography and its Application"; National Press of Defense Industry, First Edition; Jul. 31, 2001; p. 181 (and English translation thereof).

* cited by examiner

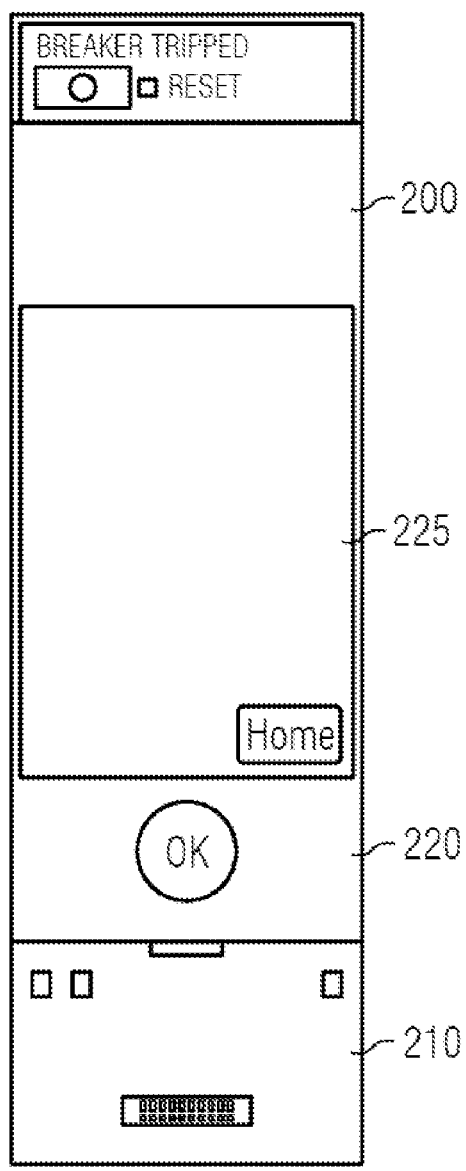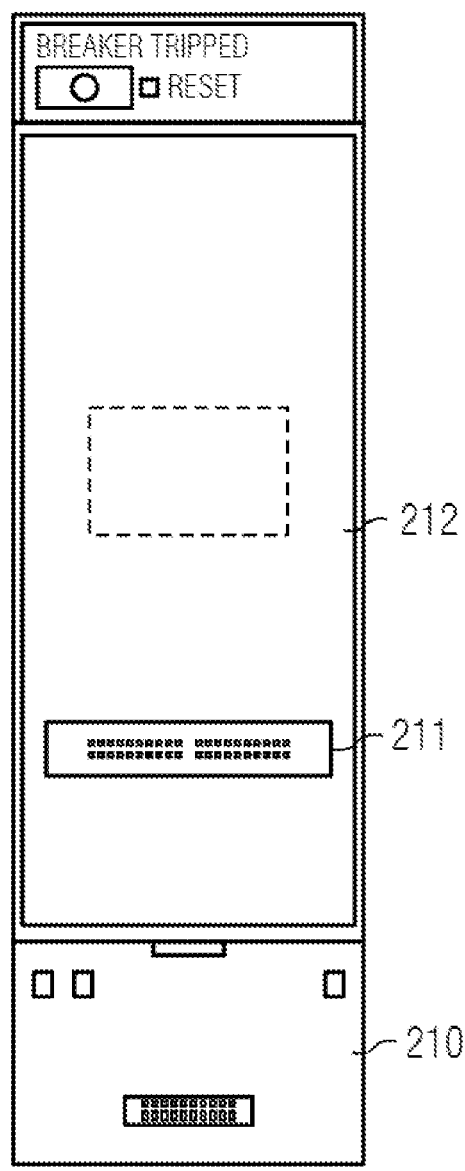

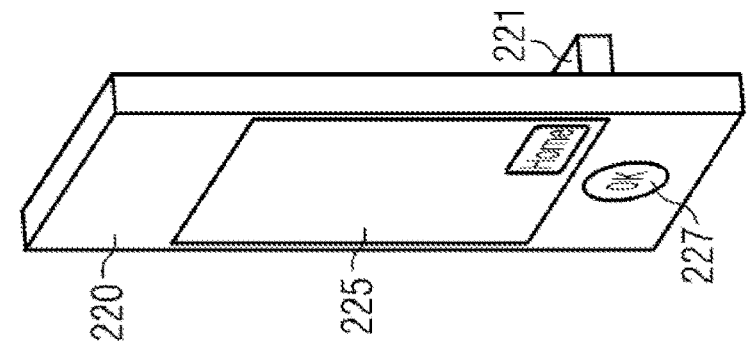
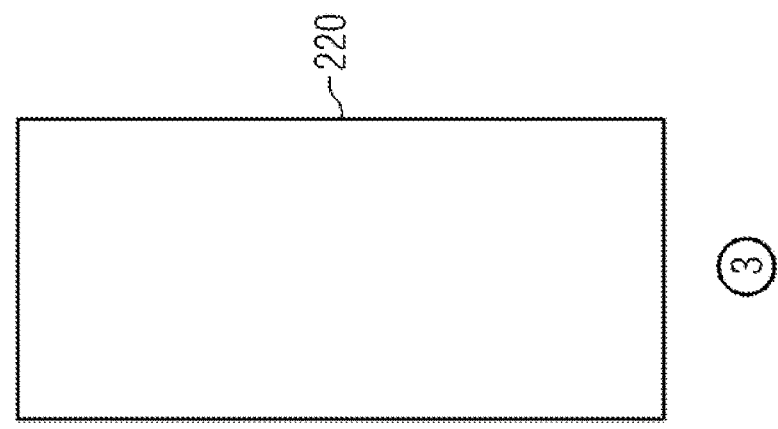
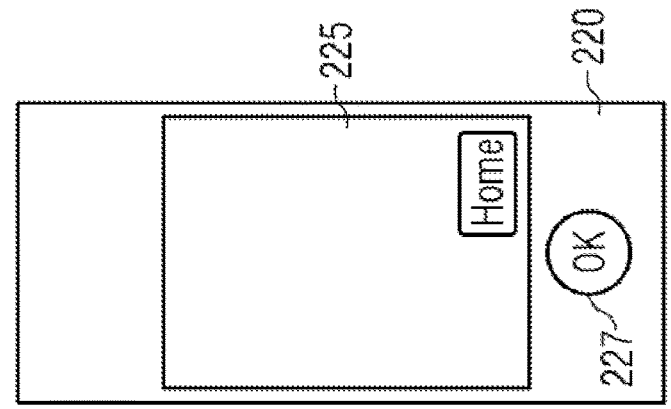
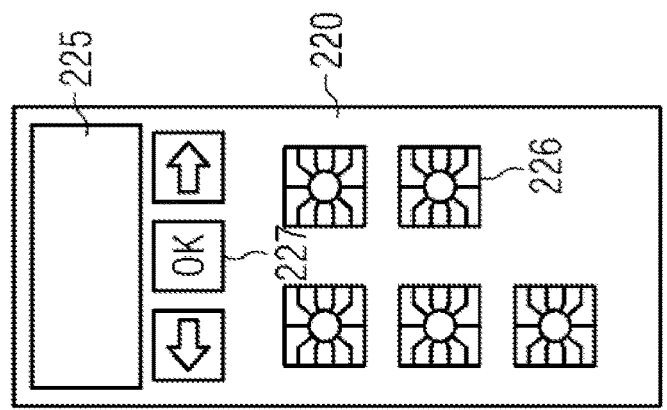

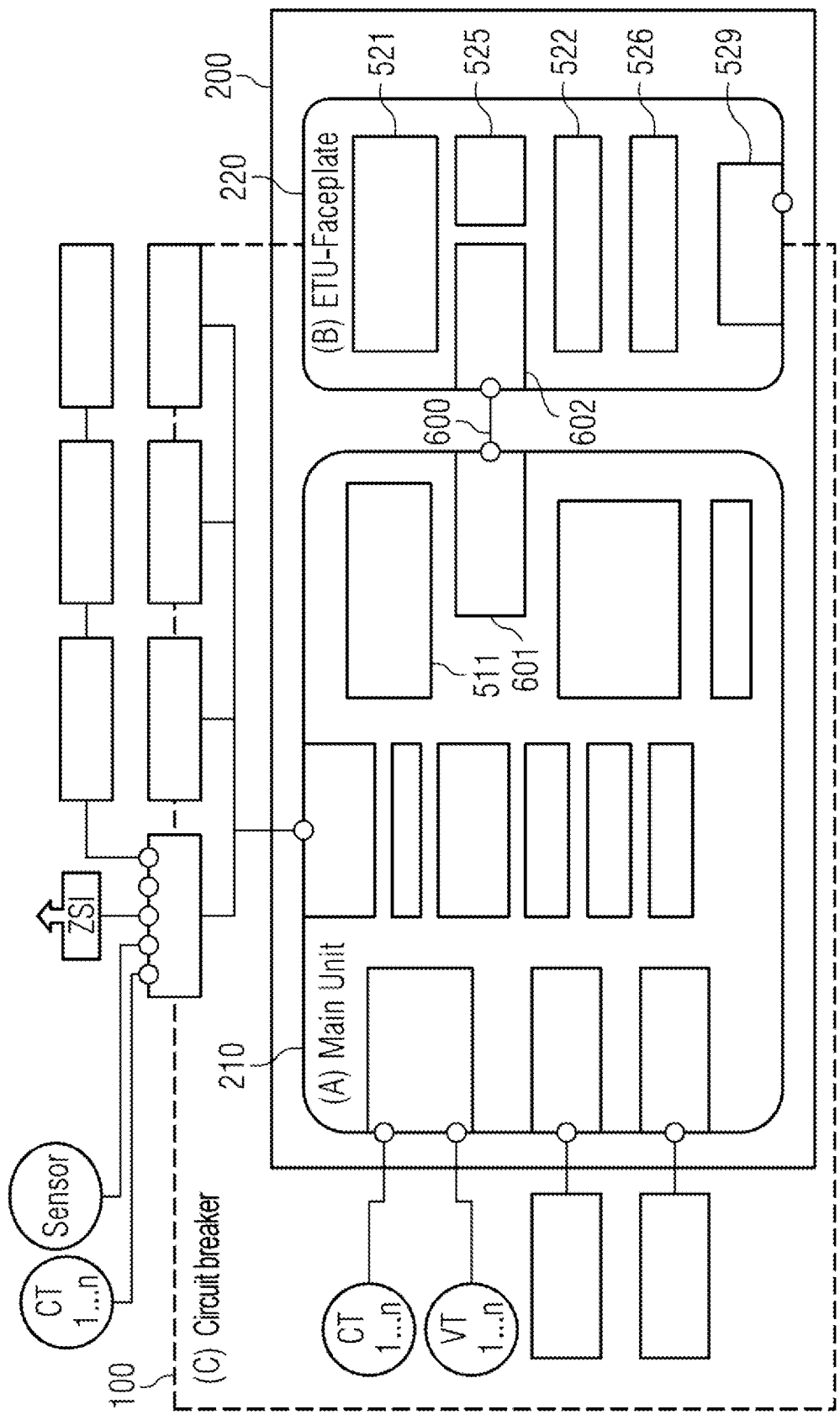

ELECTRICAL SWITCH

PRIORITY STATEMENT

The present application hereby claims priority under 35 U.S.C. § 119 to German patent application numbers DE 102015211666.2 filed Jun. 24, 2015 and DE 102015225243.4 filed Dec. 15, 2015, the entire contents of each of which are hereby incorporated herein by reference.

FIELD

At least one embodiment of the invention generally relates to an electrical switch for switching an electric current.

BACKGROUND

Electrical switches, for example low voltage circuit breakers, have an integrated protection relay. The protection relay is referred to as an electronic trip unit (ETU) for example in the case of a circuit breaker. The electronic trip unit includes, inter alia, the protection function of the electrical circuit. Additional options such as, for example, a display for status indication or else measurement functions which have no influence on the protection function itself are likewise available in electronic trip units.

Circuit breakers are produced depending on the properties required by customers and can thus completely fulfill the protection and application requirements. The diverse requirements give rise to a high variance of different electronic trip units.

For every circuit breaker, the prescribed routine testing demands detection of the calibration of the overcurrent releases, for example according to Standard IEC 60947-2 (German version EN 60947-2 Low-voltage switchgear—part 2: 2014-01). This detection may also be referred to as detection of the function of the protection functions.

SUMMARY

The inventors have further recognized that particularly this part of routine testing, requires cost-intensive equipment, for example primary current sources or calibrated measurement and testing technology. An additional factor is intensive training of personnel, high technical support costs and maintenance costs.

The inventors have further recognized that typically, the electrical switches are sent after production, without an electronic trip unit, to a modification center, where the electronic trip unit and accessories are added and then subjected to routine electrical testing.

At least one embodiment of the invention includes an electrical switch comprising an electronic trip unit, which electrical switch can be subjected to routine testing directly after production and in the case of which electrical switch the customer can himself adapt the latter specifically according to his requirements.

At least one embodiment of the invention is directed to an electrical switch. Advantageous configurations of the electrical switch according to the invention are specified in claims.

At least one embodiment of the electrical switch for switching an electric current includes an electronic trip unit. The trip unit is embodied in a bipartite fashion. The first part of the trip unit is fixedly connected to the electrical switch and includes protection functions of the electrical switch. The second part of the trip unit is embodied mountably and detachably on the electrical switch and defines the protection functions and additional functions enabled for the customer. One advantage here is that the customer obtains a tested circuit breaker and can himself configure the electrical switch by exchanging the second part of the trip unit. The cost-intensive routine testing of the electrical switch can be carried out with the first part of the trip unit by the manufacturer.

BRIEF DESCRIPTION OF THE DRAWINGS

The above-described properties, features and advantages of this invention and the way in which they are achieved will become clearer and more clearly understood in association with the following description of the example embodiments which are explained in greater detail in association with the figures.

In the figures:

FIGS. 1A and 1B show an electronic trip unit and first part of the electronic trip unit;

FIGS. 2A, 2B, 2C and 2D show variants of the second part of the electronic trip unit;

FIG. 5 shows an electrical switch with first part of the trip unit and second part of the trip unit with further functional scope;

DETAILED DESCRIPTION OF THE EXAMPLE EMBODIMENTS

Figure 3:
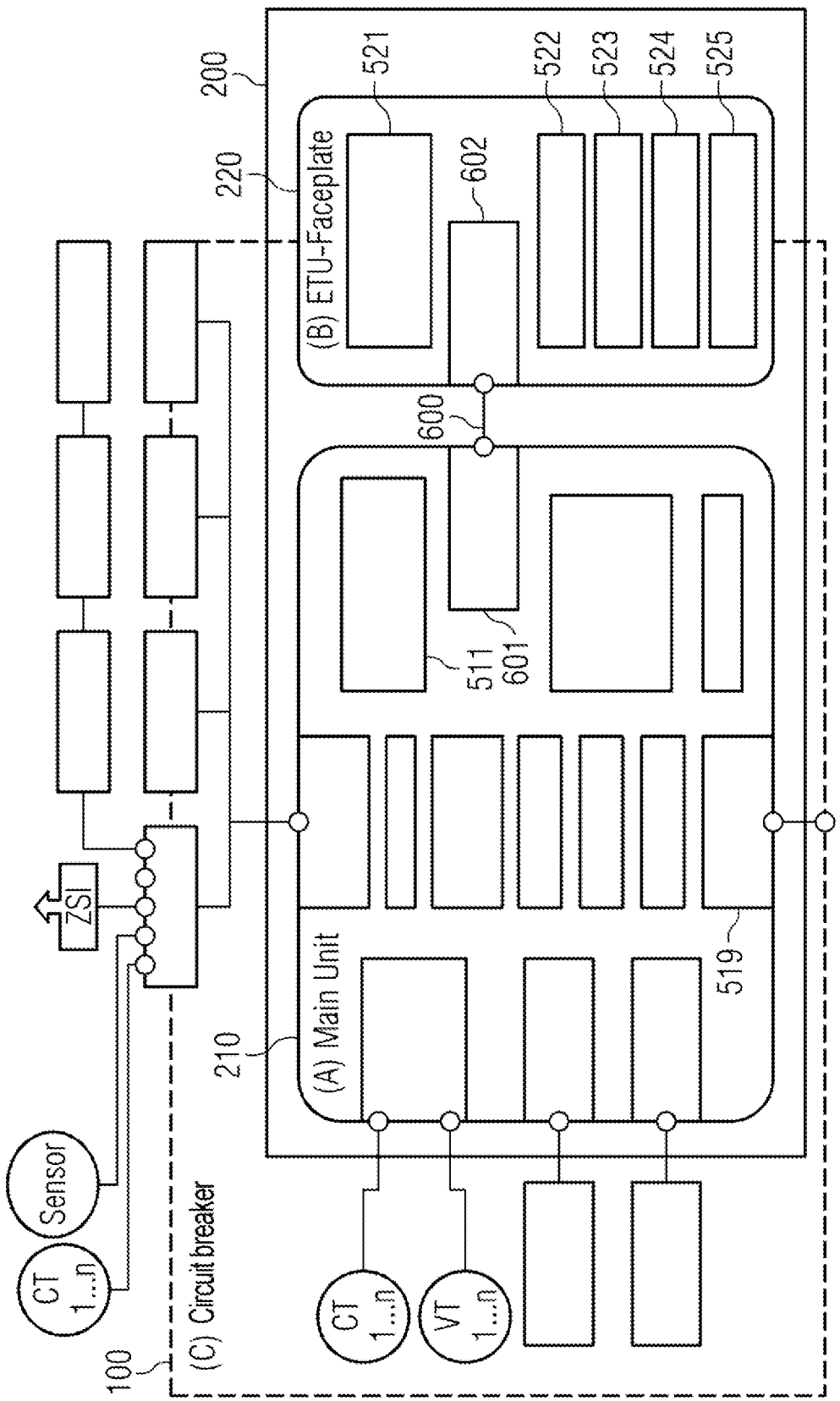
FIG. 3 shows an electrical switch with first part of the trip unit and second part of the trip unit.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the electrical switch for switching an electric current includes an electronic trip unit. The trip unit is embodied in a bipartite fashion. The first part of the trip unit is fixedly connected to the electrical switch and includes protection functions of the electrical switch. The second part of the trip unit is embodied mountably and detachably on the electrical switch and defines the protection functions and additional functions enabled for the customer. One advantage here is that the customer obtains a tested circuit breaker and can himself configure the electrical switch by exchanging the second part of the trip unit. The cost-intensive routine testing of the electrical switch can be carried out with the first part of the trip unit by the manufacturer.

In one configuration of at least one embodiment, an authentication between first part of the trip unit and second part of the trip unit ensures the communication between these two parts.

In a further configuration of at least one embodiment, the second part of the trip unit is mounted detachably on the first part of the trip unit.

In further configurations of at least other embodiments, the second part of the trip unit in the state mounted on the electrical switch communicates with the first part of the trip unit via a wired connection, via an optical connection or via a radio connection. The radio connection between the first part of the trip unit and the second part of the trip unit may be for example an NFC, Bluetooth or WiFi connection. The radio connection may furthermore be used for transmitting data to a mobile device. The mobile device may be for example a smartphone or tablet computer.

In a further configuration of at least one embodiment, the wired connection between first part of the trip unit and second part of the trip unit comprises a plug contact.

In one configuration of at least one embodiment, the second part of the trip unit additionally comprises operating and display elements. By way of example, this may be a touchscreen as operating and display element.

In one configuration of at least one embodiment, the first part of the trip unit comprises additional operating and display elements.

In a further configuration of at least one embodiment, the first part of the trip unit comprises a touchscreen as operating and display element.

In one configuration of at least one embodiment, the electrical switch is a circuit breaker.

FIG. 1A depicts an electronic trip unit 200 (ETU). In this case, the electronic trip unit is embodied in a bipartite fashion. The first part of the trip unit 210 is fixedly connected to an electrical switch 100 (not illustrated here) and includes the protection function of the electrical switch 100. The second part of the trip unit 220 is embodied mountably and detachably on the electrical switch 100 and defines the protection functions and, if appropriate, further functions enabled for the customer. By way of example, the second part of the trip unit 220 may comprise a display 225 on which settings of the protection functions and/or of the measurement functions of the second part of the trip unit 220 are represented.

FIG. 1B illustrates the electronic trip unit 200 or the first part 210 thereof. The second part of the trip unit 220, illustrated in FIG. 1A, has been detached. Consequently, by way of example, a plug connection 211 which establishes the electrical connection of the first part of the trip unit 210 to the second part of the trip unit 220 is visible.

FIGS. 2A, 2B, 2C and 2D illustrate the second part of the trip unit 220 in different variants. The customer can select for example from a plurality of electronic trip units in which the manner in which the protection functions are set and what additional functions such as measurement functions, for example, are accessible to the customer are defined in terms of hardware.

In FIG. 2A, the second part of the trip unit 220 contains a display 225, a plurality of pushbuttons 227 for selecting and confirming functional parameters and rotary encoder switches 226 for setting the protection function. In addition, the second part of the trip unit 220 may likewise comprise DIP switches for setting and adapting the protection functions.

FIG. 2B illustrates a further variant of a second part of the trip unit 220. In this case, the second part of the trip unit 220 again comprises a display 225, which is embodied as a touchscreen. Furthermore, a pushbutton 227 is present, which can be used to input menu navigations or confirmations. The second part of the trip unit 220 is thus controlled via the display 225 and the protection function and measurement functions are input via the display 225 as touchscreen.

FIG. 2C illustrates a further variant of the second part of the trip unit 220. This does not comprise any control elements, but rather only enables the protection function. The factory settings are activated in the electronic trip unit 200 and can be adapted by configuration software. Without a second part of the electronic trip unit 220, the electrical switch 100 is not functional and is not permitted to be operated.

FIG. 2D illustrates the second part of the trip unit 220 in accordance with FIG. 2B in a lateral view. Thus the plug contact 221 is also visible, which interacts with the plug contact 211 of the first part of the trip unit 210. The second part of the trip unit 220 is thus plugged onto the first part 210 and thereby contacted.

Figure 4:
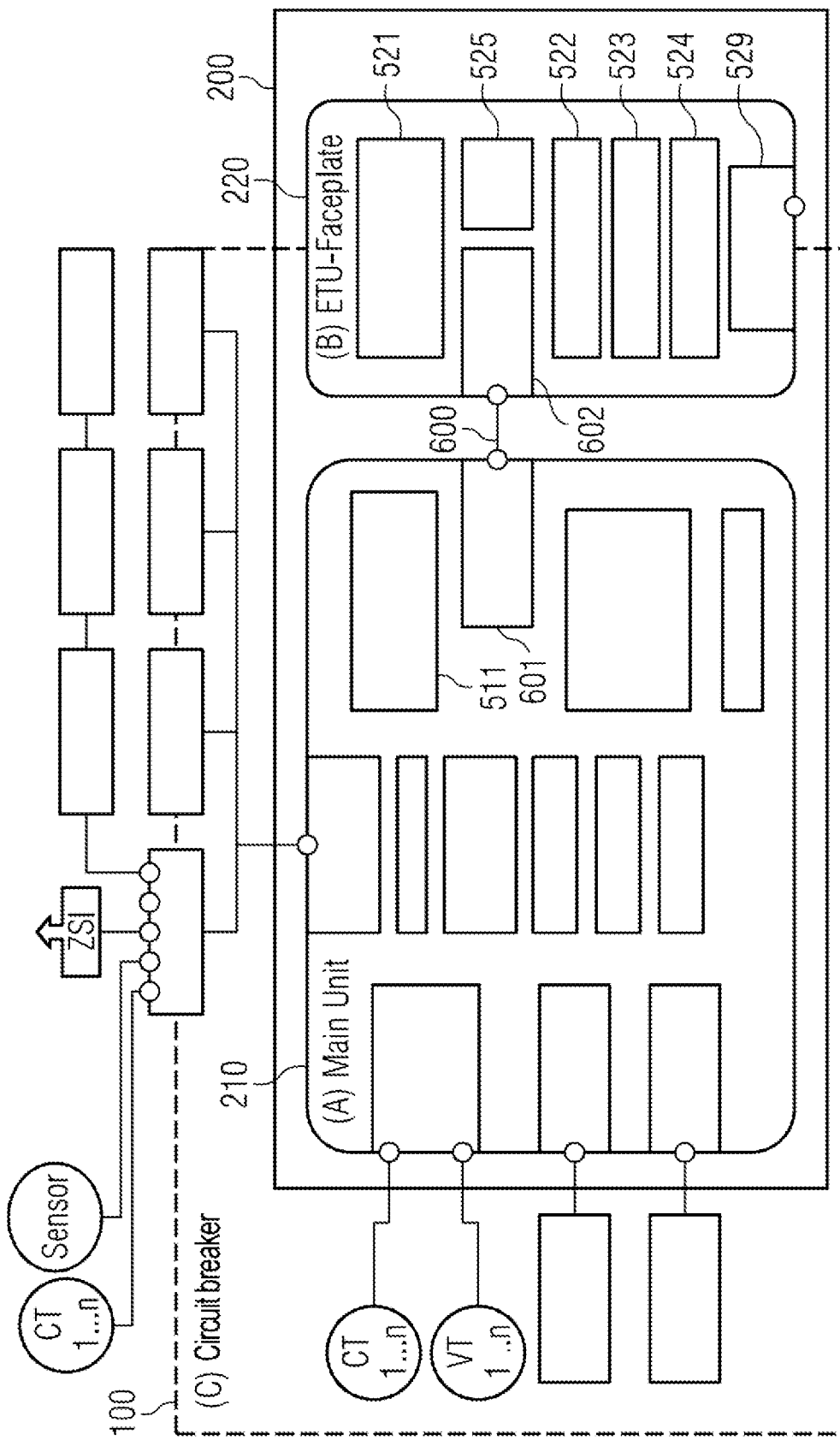
FIG. 4 shows an electrical switch with first part of the trip unit and second part of the trip unit with other functionalities.

FIGS. 3, 4 and 5 illustrate the interplay of electrical switch 100, electronic trip unit 200 (ETU) consisting of a first part of the trip unit 210 and a second part of the trip unit 220. In accordance with the variants in FIGS. 3, 4 and 5, the first part of the trip unit 210 always comprises the variant-independent protection and measurement functions 511. In addition, the first part of the trip unit 210 comprises an internal interface 601, which communicates with the internal interface 602 of the second part of the trip unit 220 via a data channel 600. The data channel 600 may be realized in a wired fashion, optically or via a radio connection. In the case of a wired connection, for example, a plug in accordance with FIGS. 1B and 2D may serve for data exchange between the first part of the trip unit 210 and the second part of the trip unit 220.

In the case of an optical connection between first part of the trip unit 210 and second part of the trip unit 220, an optical transmitter and receiver are respectively situated in each part.

It is likewise possible for the data channel 600 to be realized via a radio connection. By way of example, this may be an NFC, Bluetooth or WiFi connection. This connection may furthermore be used for transmitting data to a mobile terminal. The terminal may be for example a smartphone or tablet computer. It is thus possible for an operator to configure the electronic trip unit 200 via a smartphone or tablet computer or to display the state of the electronic trip unit 200.

In accordance with FIGS. 3, 4 and 5, the second part of the trip unit 220 comprises the variant-dependent protection and measurement functions 521. These variant-dependent protection and measurement functions 521 make it possible for the user to configure the electronic trip unit 200 for the requirements of the user. Different second parts of the trip unit 220 may comprise a different functional scope, which may be defined by the manufacturer.

The second part of the trip unit 220 comprises an authentication module 522 in accordance with FIGS. 3, 4 and 5. The authentication module 522 ensures that the second part of the trip unit 220 is an approved component for the configuration of the electronic trip unit 200 and a secure communication takes place between the first part of the trip unit 210 and the second part of the trip unit 220.

In FIG. 3, the test and parameter interface 519 is integrated in the first part of the trip unit 210. In contrast thereto, in the variant according to FIG. 4, the test and parameter interface 529 is integrated in the second part of the trip unit 220.

In accordance with FIG. 3, the variant of the second part of the trip unit 220 comprises operating elements 523, such as, for example, rotary encoder switches, DIP switches, control keys for a display or a touchscreen. The display 524 serves for displaying the states of the electronic trip unit 200.

The second part of the trip unit 220 comprises a radio connection 525, which may be for example an NFC connection, a Bluetooth connection or a WiFi connection.

In contrast to FIG. 3, in the variant in the illustration in FIG. 4, the test and parameter interface 529 is implemented in the second part of the trip unit 220.

In the variant according to FIG. 5, the second part of the trip unit 220 does not contain any operating elements, but instead a touchscreen 526, which serves for operating the electronic trip unit 200 and furthermore also as a display for displaying the settings of the electronic trip unit.

Figure 6A:
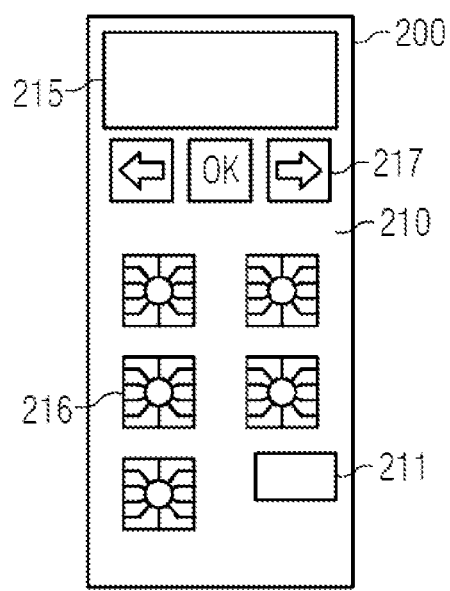
FIGS. 6A, 6B and 6C show an electrical switch with first part of the trip unit, second part of the trip unit and first and second parts of the trip unit.
Figure 6C:
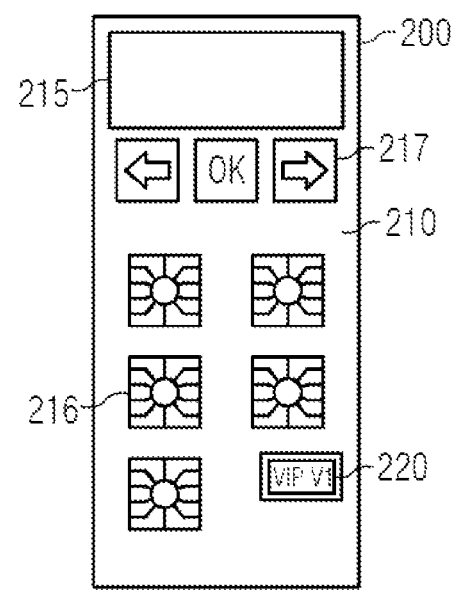
Figure 6B:

FIGS. 6A, 6B and 6C illustrate a further variant. In this variant, the second part of the trip unit 220 does not contain any operating elements, rather a pure plug (VIP: "Variant Identification Plug") is involved which enables the protection functions ordered and paid for by the customer. The first part of the trip unit 220 contains operating elements 216; 217 and a display element 215. The operating elements may likewise be for example rotary encoder switches, DIP switches or control keys for a display or a touchscreen. The display 215 serves for displaying the states of the electronic trip unit 200.

A third part of the trip unit, which is likewise embodied as a plug ("rating plug") like the second part of the trip unit 220, may serve for setting the rated current of the trip unit. The third part of the trip unit may be embodied such that it is pluggable into the first part of the trip unit 210.

The first part of the trip unit 210 includes all protection functions and the measurement functions and has all necessary hardware and software functions for the protection functions. The first part of the trip unit 210 is thus variant-independent and is intended to be identical in all circuit breakers 100. The circuit breaker 100 with the first part of the trip unit 210 is subjected to routine testing according to Standard IEC 60947-2 in a central manufacturing site of the manufacturer. The first part of the trip unit 210 without the second part of the trip unit 220 has for example only the basic protection LI in the smallest setting values.

The second part of the trip unit 220 includes, in a variant-dependent manner, the setting possibilities for the protection functions and the measurement functions and enables the respective protection and measurement functions in the first part of the trip unit 210. Depending on the variant, the operating and display concept of the second part of the trip unit 220 may change.

The first part of the trip unit 210 is fixedly connected to the electrical switch 100. This may be a circuit breaker, for example.

The second part of the trip unit 220 is embodied mountably and detachably on the electrical switch 100. In one variant, the second part of the trip unit 220 is mounted detachably on the first part of the trip unit 210.

The first part of the trip unit 210 includes all protection functions and the measurement functions. The functions are enabled in the first part of the trip unit 210 by the second part of the trip unit 220. The first part of the trip unit 210 together with the second part of the trip unit 220 determine the electronic trip unit versions, for example LI, LSI, LSIG, etc.

The second part of the trip unit 220 is variant-dependent and includes only the protection and measurement functions bought by the client. The second part of the trip unit 220 enables this function in the first part of the trip unit 210.

The test and parameterization interface 519 or 529 may be integrated in the first part of the trip unit 210 or in the second part of the trip unit 220. The test and parameterization interface may be constructed modularly and be exchanged by the customer.

Optionally, the first part of the trip unit 210 or the second part of the trip unit 220 may be equipped with a wireless connection 525 such as, for example, NFC, Bluetooth or WiFi. This connection may be used, inter alia, to display data or measurement values on a smartphone or tablet computer.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrical switch for switching an electric current, comprising:
    an electronic trip unit (ETU), the electronic trip unit being embodied in a bipartite fashion including a first and second part,
        the first part of the electronic trip unit being fixedly connected to the electrical switch and including protection functions of the electrical switch, and
        the second part of the electronic trip unit being a removable face plate embodied mountably and detachably on the first part of the electrical switch and being configured to define user configurable protection functions of the first part enabled for a customer of the electrical switch, wherein the second part of the electronic trip unit, in a state mounted on the electrical switch, is configured to communicate with the first part of the electronic trip unit via a wired connection, via an optical connection or via a radio connection, wherein the radio connection is configured to transmit data to a mobile device, and wherein the first part includes non-reconfigurable variant-independent protection and measurement functions and wherein the second part has mounted thereon a memory configured to receive and store user configurable ETU variant-dependent protection and measurement functions provided via a user interface on the second part to configure the ETU.

2. The electrical switch of claim 1, wherein the second part includes a processor configured to provide an authentication between the first part of the electronic trip unit and the second part of the electronic trip unit is configured to ensure the second part is an approved component of the electronic trip unit and ensure secure communication between the first part of the electronic trip unit and the second part of the electronic trip unit.

3. The electrical switch of claim 1, wherein the second part of the electronic trip unit is mounted detachably on the first part of the electronic trip unit.

4. The electrical switch of claim 1, wherein the radio connection between the first part of the electronic trip unit and the second part of the electronic trip unit is a Near Field Connection (NFC), Bluetooth or WiFi connection.

5. The electrical switch of claim 1, wherein the mobile device is a smartphone or tablet computer.

6. The electrical switch of claim 1, wherein the wired connection between first part of the electronic trip unit and second part of the electronic trip unit comprises a plug contact.

7. The electrical switch of claim 1, wherein the second part of the electronic trip unit comprises additional operating and display elements.

8. The electrical switch of claim 1, wherein the second part of the electronic trip unit comprises a touchscreen as operating and display element.

9. The electrical switch of claim 1, wherein the first part of the electronic trip unit comprises additional operating and display elements.

10. The electrical switch of claim 1, wherein the first part of the electronic trip unit comprises a touchscreen as operating and display element.

11. The electrical switch of claim 1, wherein the electrical switch is a circuit breaker.

12. The electrical switch of claim 2, wherein the second part of the electronic trip unit is mounted detachably on the first part of the electronic trip unit.

13. The electrical switch of claim 2, wherein the wired connection between first part of the electronic trip unit and second part of the electronic trip unit comprises a plug contact.

14. The electrical switch of claim 2, wherein the second part of the electronic trip unit comprises additional operating and display elements.

15. The electrical switch of claim 2, wherein the second part of the electronic trip unit comprises a touchscreen as operating and display element.

16. The electrical switch of claim 2, wherein the first part of the electronic trip unit comprises additional operating and display elements.

17. The electrical switch of claim 2, wherein the first part of the electronic trip unit comprises a touchscreen as operating and display element.

18. The electrical switch of claim 2, wherein the electrical switch is a circuit breaker.

19. The electrical switch of claim 3, wherein the wired connection between first part of the electronic trip unit and second part of the electronic trip unit comprises a plug contact.

20. The electrical switch of claim 3, wherein the second part of the electronic trip unit comprises additional operating and display elements.

21. The electrical switch of claim 3, wherein the second part of the electronic trip unit comprises a touchscreen as operating and display element.

22. The electrical switch of claim 3, wherein the first part of the electronic trip unit comprises additional operating and display elements.

23. The electrical switch of claim 3, wherein the first part of the electronic trip unit comprises a touchscreen as operating and display element.

24. The electrical switch of claim 3, wherein the electrical switch is a circuit breaker.

25. The electrical switch of claim 1, wherein the second part does not include a display.

26. The electrical switch of claim 1, further comprising a test and parameter interface integrated in the first part of the electronic trip unit.

27. The electrical switch of claim 1, wherein the first part of the electronic trip unit includes all protection functions and the measurement functions and the protection functions and the measurement functions are enabled in the first part of the trip unit by the second part of the trip unit.

* * * * *